United States Patent
Tsuruoka (10) Patent No.: US 6,619,775 B2
(45) Date of Patent: Sep. 16, 2003

(54) PRINTING APPARATUS AND PRINTING METHOD

(75) Inventor: Yuji Tsuruoka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/749,932

(22) Filed: Dec. 29, 2000

(65) Prior Publication Data

US 2001/0019341 A1 Sep. 6, 2001

(30) Foreign Application Priority Data

Jan. 5, 2000 (JP) .......................... 2000-000514

(51) Int. Cl.[7] ................................ B91J 29/38
(52) U.S. Cl. ..................... 347/5; 347/211; 347/180; 347/19
(58) Field of Search ................. 347/12, 14, 19, 347/5, 211, 162, 168, 128, 145, 180, 181, 182; 358/1.16, 1.13; 400/120.05, 120.06

(56) References Cited

U.S. PATENT DOCUMENTS

| 4,313,124 A | 1/1982 | Hara ........................ 346/140 |
| 4,345,262 A | 8/1982 | Shirato et al. ............... 346/140 |
| 4,459,600 A | 7/1984 | Sato et al. .................... 346/10 |
| 4,463,359 A | 7/1984 | Ayata et al. ................. 346/140 |
| 4,558,333 A | 12/1985 | Sugitani et al. ............. 346/140 |
| 4,608,577 A | 8/1986 | Hori ........................... 346/140 |
| 4,723,129 A | 2/1988 | Endo et al. .................. 346/1.1 |
| 4,740,796 A | 4/1988 | Endo et al. .................. 346/1.1 |
| 5,646,660 A * | 7/1997 | Murray ........................ 347/59 |
| 5,742,305 A | 4/1998 | Hackleman ................... 347/42 |
| 5,760,796 A * | 6/1998 | Hayasaki et al. ............. 347/13 |
| 5,889,537 A * | 3/1999 | Shimada ...................... 347/41 |
| 5,907,331 A * | 5/1999 | Markham ..................... 347/12 |
| 6,076,914 A * | 6/2000 | Imai ........................... 347/19 |
| 6,086,272 A * | 7/2000 | Kawase et al. ............... 400/61 |

FOREIGN PATENT DOCUMENTS

| EP | 0 927 635 | 7/1999 |
| EP | 1 070 587 | 1/2001 |
| JP | 54-56847 | 5/1979 |
| JP | 59-123670 | 7/1984 |
| JP | 59-138461 | 8/1984 |
| JP | 60-71260 | 4/1985 |
| JP | 8-108538 | 4/1996 |
| JP | 8-197777 | 8/1996 |
| JP | 10-128982 | 5/1998 |

* cited by examiner

Primary Examiner—John Barlow
Assistant Examiner—Lam Nguyen
(74) Attorney, Agent, or Firm—Fitzpatrick, Cella, Harper & Scinto (57) ABSTRACT

This invention discloses a printing apparatus and printing method for shortening the print data transfer time in thinning and driving nozzles in high-speed printing, multipass printing, or the like. In thinning and driving nozzle blocks, a printer main body transmits data representing a print mode, and print data corresponding to nozzles to be used. In a printhead, a shift clock generator generates a shift clock shortened in period in accordance with the thinning ratio, and a shift register stores the print data in correspondence with the clock. Print data corresponding to the printing elements to be used are repetitively stored in areas corresponding to printing elements not to be used.

21 Claims, 11 Drawing Sheets

FIG. 1

| NOZZLE NO. | BLK | PRINT MODE | | |
|---|---|---|---|---|
| | | NORMAL | 1/2-THINNING | 1/4-THINNING |
| 1 | 0 | N1 | N1 | N1 |
| 2 | 1 | N2 | N1 | N1 |
| 3 | 2 | N3 | N3 | N1 |
| 4 | 3 | N4 | N3 | N1 |
| 5 | 0 | N5 | N5 | N5 |
| 6 | 1 | N6 | N5 | N5 |
| 7 | 2 | N7 | N7 | N5 |
| 8 | 3 | N8 | N7 | N5 |
| 9 | 0 | N9 | N9 | N9 |
| 10 | 1 | N10 | N9 | N9 |
| 11 | 2 | N11 | N11 | N9 |
| 12 | 3 | N12 | N11 | N9 |
| 13 | 0 | N13 | N13 | N13 |
| 14 | 1 | N14 | N13 | N13 |
| 15 | 2 | N15 | N15 | N13 |
| 16 | 3 | N16 | N15 | N13 |

THINNED NOZZLE

PRINTING APPARATUS AND PRINTING METHOD

FIELD OF THE INVENTION

The present invention relates to a printing apparatus and printing method and, more particularly, to a printing apparatus and printing method for printing by scanning a print medium by a carriage which supports a printhead having a plurality of printing elements aligned in a predetermined direction, in a direction perpendicular to the alignment direction of the printing elements.

BACKGROUND OF THE INVENTION

As an information output apparatus in a wordprocessor, personal computer, facsimile apparatus, or the like, there is a printer for printing information such as desired characters and images on a sheet-like print medium such as a paper sheet or film.

The printing method of the printer includes various known methods. In recent years, an inkjet method particularly is receiving a great deal of attention because the inkjet method enables noncontact printing on a print medium such as a paper sheet, easily prints a color image, and generates little noise. In terms of low cost and easy downsizing, the printer generally widely adopts a serial printing arrangement in which a printhead for discharging ink in accordance with desired print information is mounted, and printing is done while the printhead is reciprocally scanned in a direction perpendicular to the feed direction of a print medium such as a paper sheet.

The inkjet printhead generally comprises a plurality of printing elements (nozzles) for discharging ink that are aligned in the feed direction of the print medium (subscan direction). As the driving method, the printhead uses foaming energy generated upon driving an electrothermal transducer (heater) set in a nozzle, or uses shrinkage of a piezoelectric element set in a nozzle.

In any driving method, simultaneous drive of all nozzles decreases the print quality due to crosstalk between the respective nozzles, or it requires a large-capacity power supply because a large current temporarily flows. To prevent this problem, nozzles are divided into several blocks to execute time-division driving of time-sequentially driving the nozzles in units of blocks.

Print data is transferred for each data (column) in the nozzle alignment direction printable when the printhead simultaneously drives all the nozzles. In general, data of the next column are serially transferred while the current column is driven.

Recently, a higher throughput is demanded. To meet this demand, various methods are proposed and implemented. For example, one general method is to shorten the driving time-. However, a certain period of time is required in order to obtain foaming power enough to discharge ink droplets by driving a heater. The throughput cannot be so increased by shortening the driving time.

On the other hand, another method increases the number of nozzles aligned on a printhead and increases a print width printable by one scan. If, however, the number of nozzles of the printhead is increased, the number of data printed simultaneously increases, which prolongs the print data transfer time.

Still another method uses a high-speed print mode in addition to a normal print mode, and thins and prints print data to realize high-speed printing, as disclosed in Japanese Patent Application No. 11-204957. Thinning printing is realized by thinning driving blocks, so that the driving time is shortened. However, in a printhead having a large number of nozzles, the data transfer time is longer than the driving time, and the actual throughput does not increase as expected.

For this reason, sometimes the frequency of a data transfer clock is increased to shorten the data transfer time. Since data is transferred to the printhead via an FPC cable, the upper limit of the frequency of the transfer clock is about 10 MHz, and the throughput cannot be so increased.

Also in a print mode in which multipass printing is done by scanning the same printing region a plurality of number of times, print data is thinned and printed in each scan. Also in this case, the scan speed cannot be increased owing to the print data transfer time.

SUMMARY OF THE INVENTION

The present invention has been made in consideration of the above situation, and has as its object to provide a printing apparatus and printing method capable of shortening the print data transfer time and increasing the throughput in thinning and printing print data in a high-speed print mode, multipass printing, or the like.

To achieve the above object, according to the present invention, there is provided a printing apparatus for printing by scanning a print medium by a carriage which supports a printhead having a plurality of printing elements aligned in a predetermined direction, in a direction perpendicular to an alignment direction of the printing elements, comprising:

- transmission means for serially transmitting print data to the printhead;
- storage means for storing the print data transmitted from the transmission means in correspondence with the respective printing elements;
- holding means for reading out and holding the print data stored in the storage means; and
- driving means for driving the respective printing elements in accordance with the print data held in the holding means,
- wherein when a print mode in which printing is performed only by some of the plurality of printing elements by one scan is selected,
- the transmission means transmits print data corresponding to the printing elements used for printing, and
- the storage means stores data transmitted from the transmission means at a speed which is a reciprocal multiple of a ratio of the printing elements used for printing.

To achieve the above object, according to the present invention, there is provided a printing method of printing by scanning a print medium by a carriage which supports a printhead having a plurality of printing elements aligned in a predetermined direction, in a direction perpendicular to an alignment direction of the printing elements, comprising:

- the transmission step of serially transmitting print data to the printhead;
- the storage step of storing the print data transmitted in the transmission step in storage means in correspondence with the respective printing elements;
- the holding step of reading out and holding in holding means the print data stored in the storage means; and
- the driving step of driving the respective printing elements in accordance with the print data held in the holding means, wherein when a print mode in which printing is performed only by some of the plurality of printing elements by one scan is selected, the transmission step comprises transmitting print data corresponding to the printing elements used for printing, and the storage step comprises storing data transmitted in the transmission step at a speed which is a reciprocal multiple of a ratio of the printing elements used for printing.

More specifically, in a printing apparatus for printing by scanning a print medium by a carriage which supports a printhead having a plurality of printing elements aligned in a predetermined direction, in a direction perpendicular to the alignment direction of the printing elements, print data are serially transmitted to the printhead, and the transmitted print data are stored in correspondence with the respective printing elements. The stored print data are simultaneously read out and held, and the respective printing elements are driven in accordance with the held print data. When a print mode in which printing is done only by some of the plurality of printing elements by one scan is selected, print data corresponding to printing elements used for printing are transmitted, and the transmitted data are stored at a speed which is a reciprocal multiple of the ratio of printing elements used for printing.

With this arrangement, when the print mode in which printing is done only by some of the plurality of printing elements by one scan is selected, the processing speed in executing storage processing is increased to a reciprocal multiple of the ratio of printing elements to be used. For example, the speed of storage processing is doubled for a print mode using half the printing elements. Accordingly, the time necessary for data processing until the respective printing elements are driven after transmitted print data are received is shortened without changing processing subsequent to holding processing.

In thinning and driving nozzles in high-speed printing, multipass printing, or the like, the time required for print data transfer processing can be shortened without using any special control or complicated arrangement. This can more greatly increase the print speed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Transfer of Print Data

Transfer of print data in the above-described inkjet printer will be explained.

As the mainstream of printheads used in recent printers, the number of nozzles is as large as 300 to 600 so as to enable high-speed, high-resolution printing, and the number of driving blocks is 16 to 32. In the following example, the number of nozzles is 16, and the number of driving blocks is 4 for descriptive convenience.

Conventional Data Transfer

A basic data transfer method and driving method adopted in a general printhead will be described with reference to FIG. 7 which is a block diagram showing the internal circuit of a printhead, and FIG. 8 which is a timing chart showing respective signals.

Figure 7:
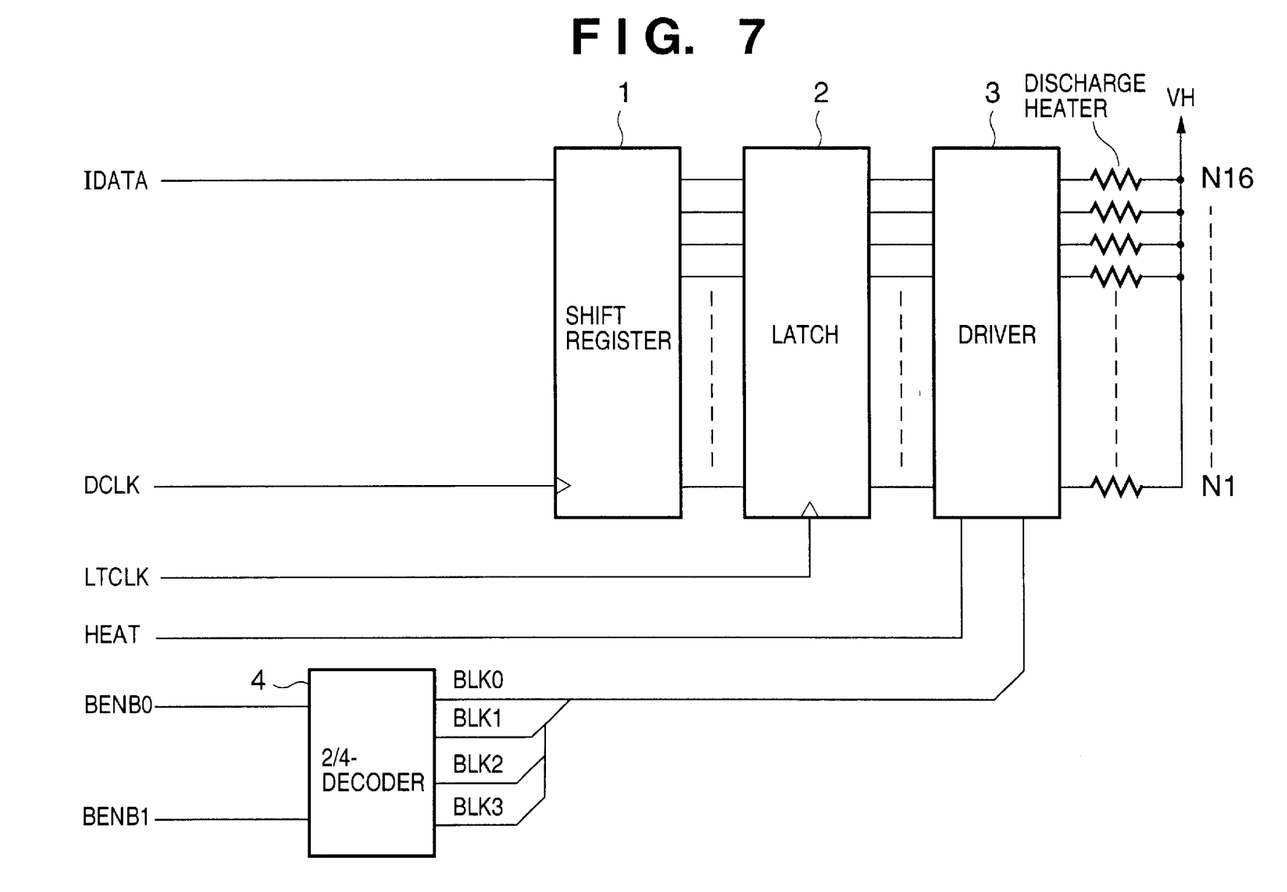
FIG. 7 is a block diagram showing the internal circuit of a conventional printhead.
Figure 8:
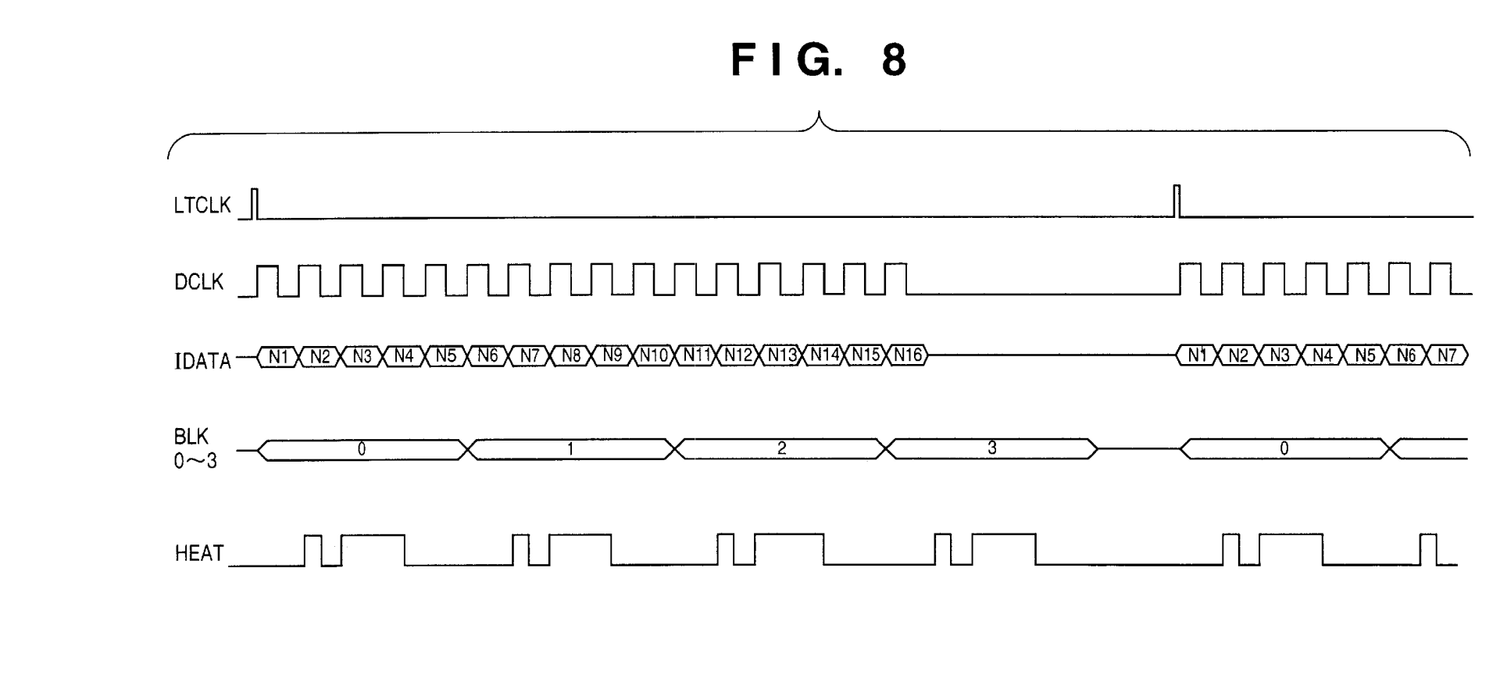
FIG. 8 is a timing chart of the conventional printhead.
Figure 9:
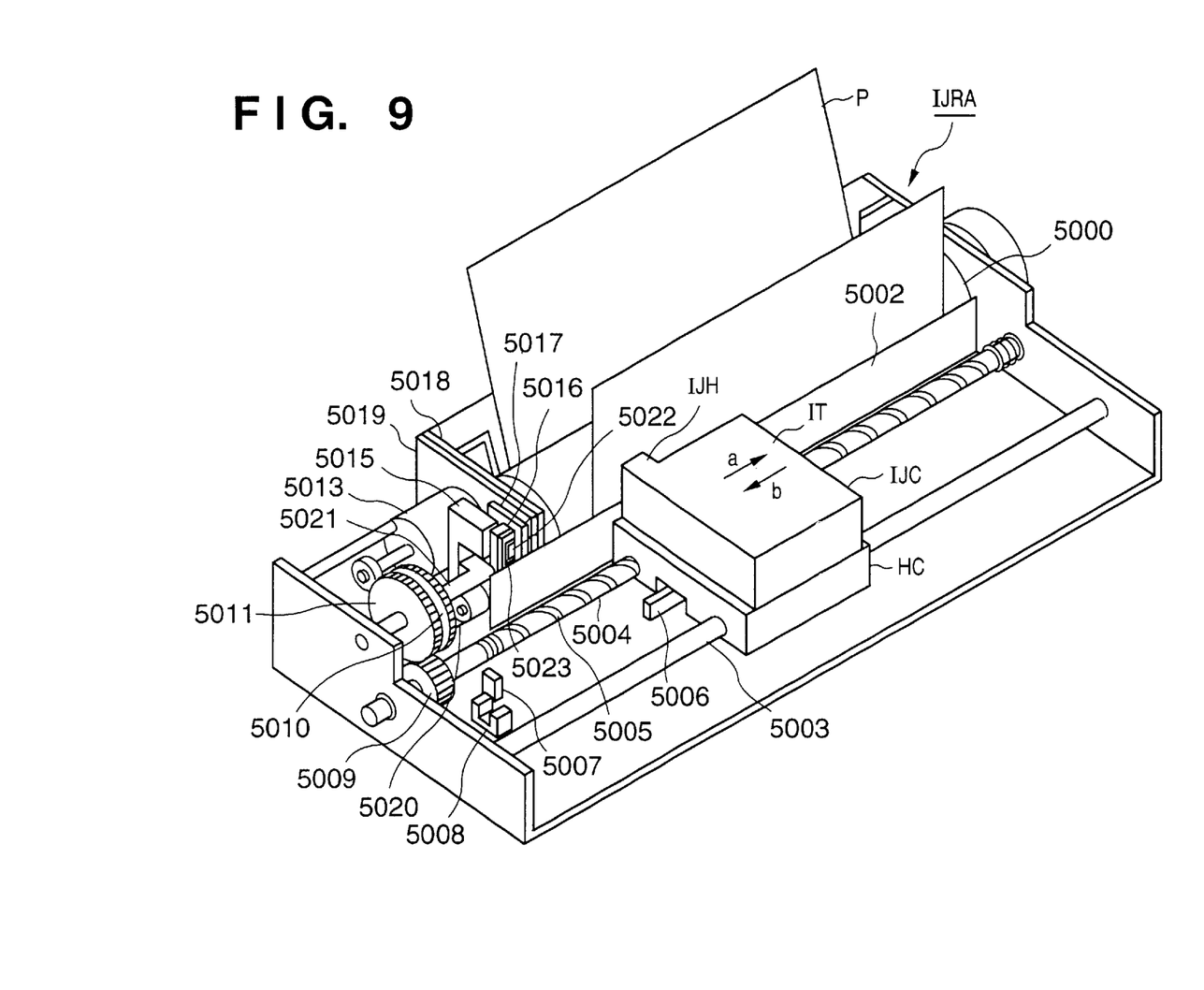
FIG. 9 is a perspective view showing an outer appearance of a printer as a preferred embodiment of the present invention.
Figure 10:
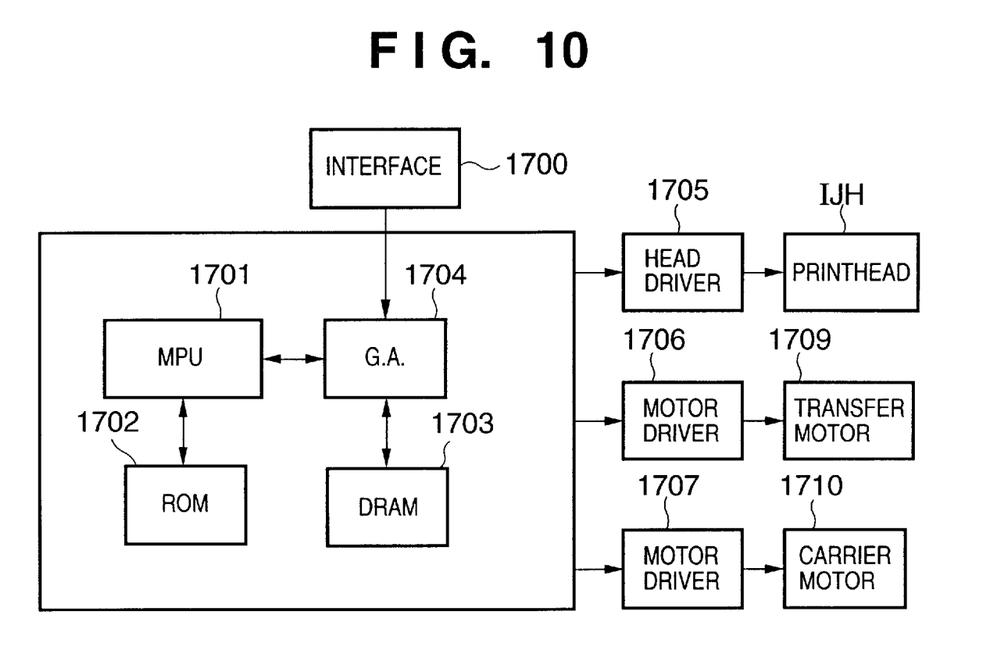
FIG. 10 is a block diagram showing a control arrangement of the printer in FIG. 9.
Figure 11:
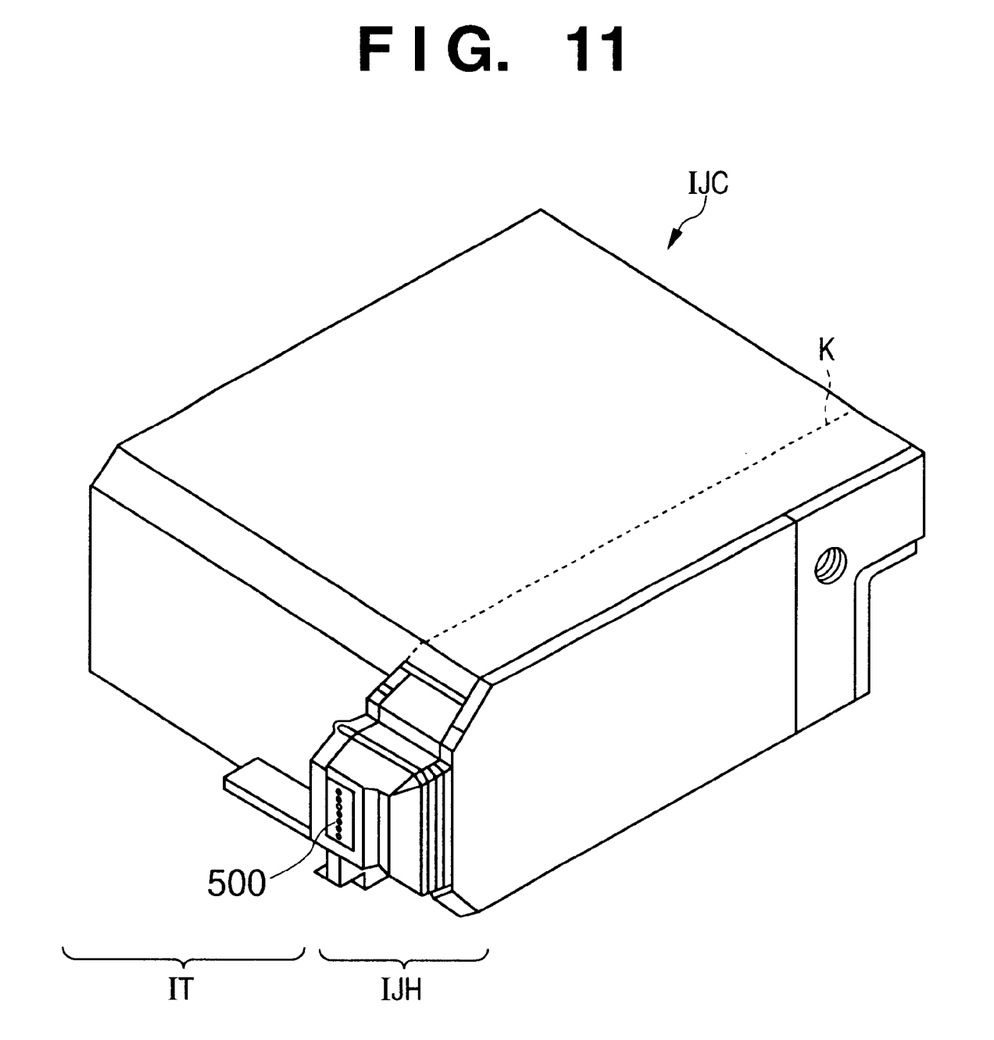
FIG. 11 is a perspective view showing an inkjet cartridge of the printer in FIG. 9.

As shown in FIG. 7, the printhead comprises a shift register 1 for storing print data of one column inputted via a signal IDATA in synchronism with a data clock signal DCLK from a printer main body, a latch 2 for temporarily holding data transmitted from the shift register, a driver 3 for driving a block designated by a block selection signal BLK among data held by the latch in synchronism with a driving signal HEAT, a 2/4-decoder 4 for decoding signals BENB0 and BENB1 into block selection signals BLK0 to BLK3, and discharge heaters N1 to N16 corresponding to respective nozzles.

Print data of 16 nozzles, i.e., one column, are serially transferred from the printer main body to the data input signal IDATA in synchronism with the leading edge of the data clock DCLK. The shift register 1 has an area for storing print data of one column, and all the print data are temporarily stored in the shift register 1.

Serial transfer from the printer is sequentially done in units of columns, and data in the shift register are sequentially updated. When data transfer of one column is complete, a pulse is output to a latch clock LTCLK before data of the next column are transferred. The data are transmitted to and held by the latch 2 at the timing at which print data of a predetermined column are stored in the shift register 1. As a result, print data of each column are always updated and held in the latch 2.

Print data of each column are ORed by the driver 3 with the block selection signals BLK0 to BLK3 for selecting a driving block, and the driving signal HEAT for supplying a driving pulse to the discharge heater. The driver 3 actually drives the discharge heaters N1 to N16 on the basis of the OR. BLK0 to BLK3 are signals obtained by decoding BENB0 and BENB1 by the 2/4-decoder 4. Printing of one column is driven at four divided timings corresponding to BLK0 to BLK3.

Figure 1:
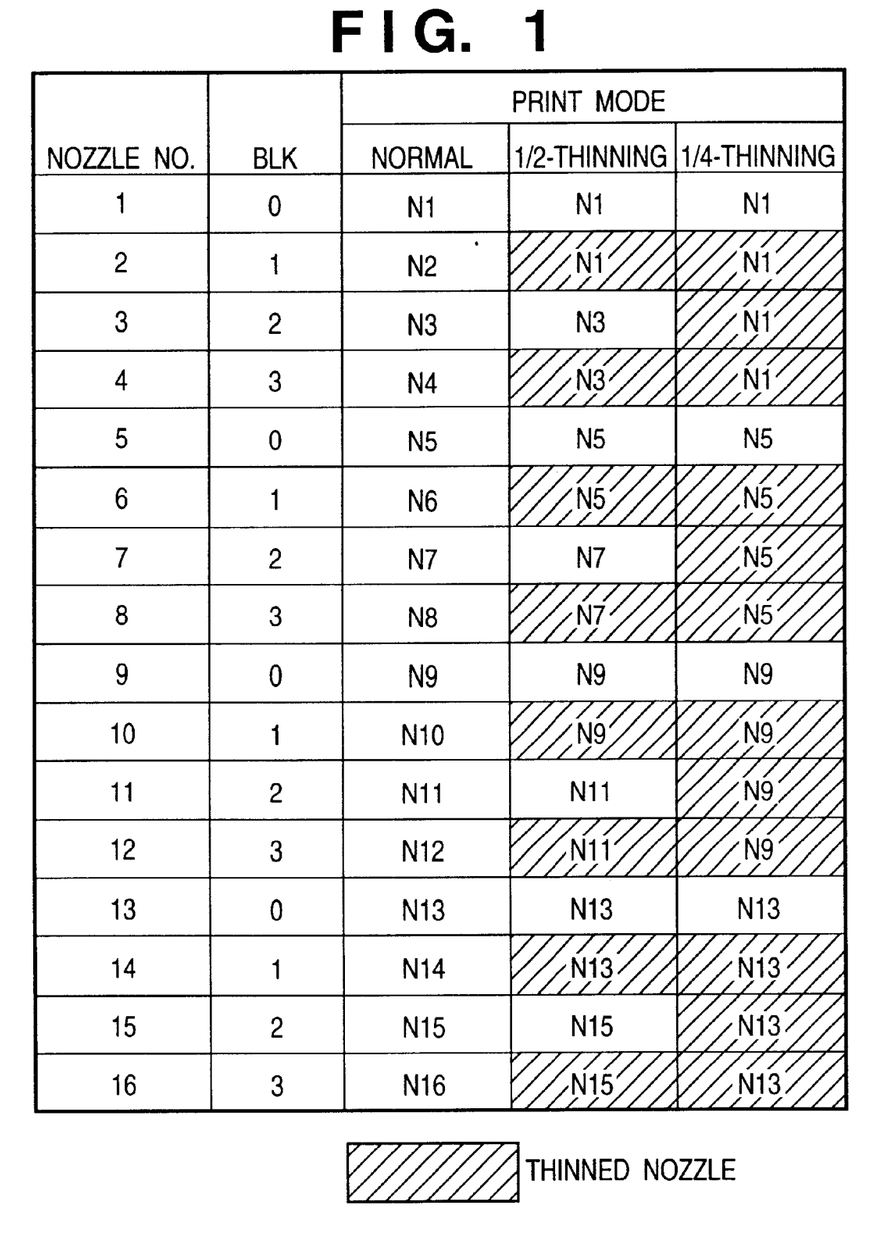
FIG. 1 is a table showing print data transmitted to a nozzle in each print mode according to an embodiment of the present invention.

Note that correspondences between the nozzles and the blocks are assigned as shown in FIG. 1. In this printhead, nozzles 1, 5, 9, and 13 are assigned to BLK0; nozzles 2, 6, 10, and 14, to BLK1; nozzles 3, 7, 11, and 15, to BLK2; and nozzles 4, 8, 12, and 16, to BLK3. The nozzles are driven in accordance with the states of corresponding signals.

In this manner, the conventional printhead cannot normally print until data transfer of all the nozzles is completed. Thus, the data transfer time cannot be shortened.

As a high-speed printing method, there is a method of thinning and driving driving blocks, as disclosed in Japanese Patent Application No. 11-204957 described above. This method can shorten the driving time, but does not suggest any means of shortening the print data transfer time.

Data Transfer of Embodiment

The present invention pays attention to this, and shortens the print data transfer time in thinning driving. An embodiment of such data transfer will be described in detail.

FIG. 1 shows print data transferred in each print mode of the printer according to this embodiment. The printer of this embodiment has 1/2- and 1/4-thinning print modes in addition to a normal print mode in which it prints using all the nozzles.

FIG. 1 shows data set for each nozzle and thinned nozzles in the three print modes. The hatched portion means a nozzle which is not actually driven (is thinned). Reference symbols N1 to N16 denote print data corresponding to nozzles 1 to 16.

As is shown in FIG. 1, in the normal mode, printing is done using all the nozzles, no nozzle is thinned, and print data are set for corresponding nozzles. In the 1/2- and 1/4-thinning modes, nozzles to be thinned are set in accordance with the thinning ratio, and corresponding print data are set for nozzles which are not thinned.

Figure 2:
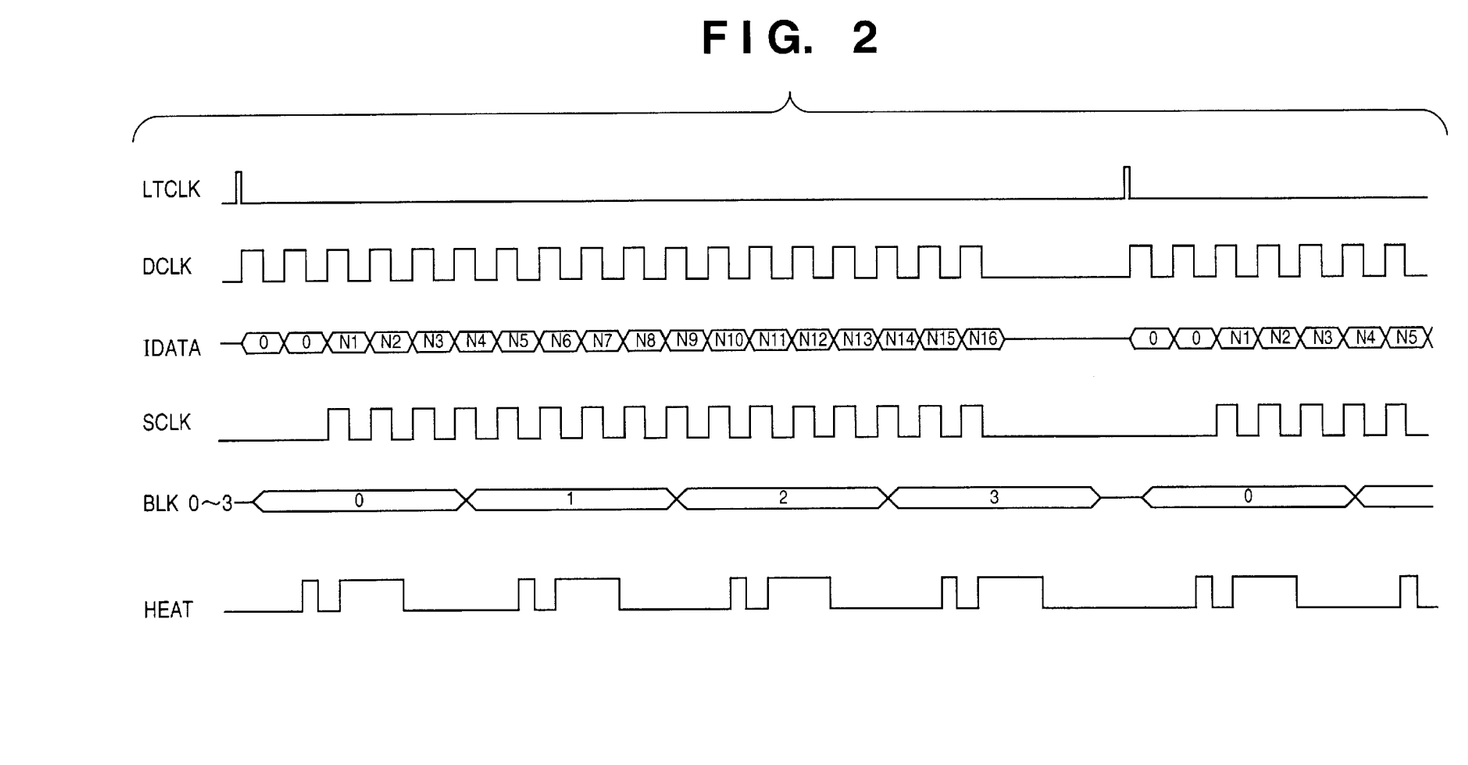
FIG. 2 is a timing chart of a normal print mode according to the embodiment.
Figure 3:
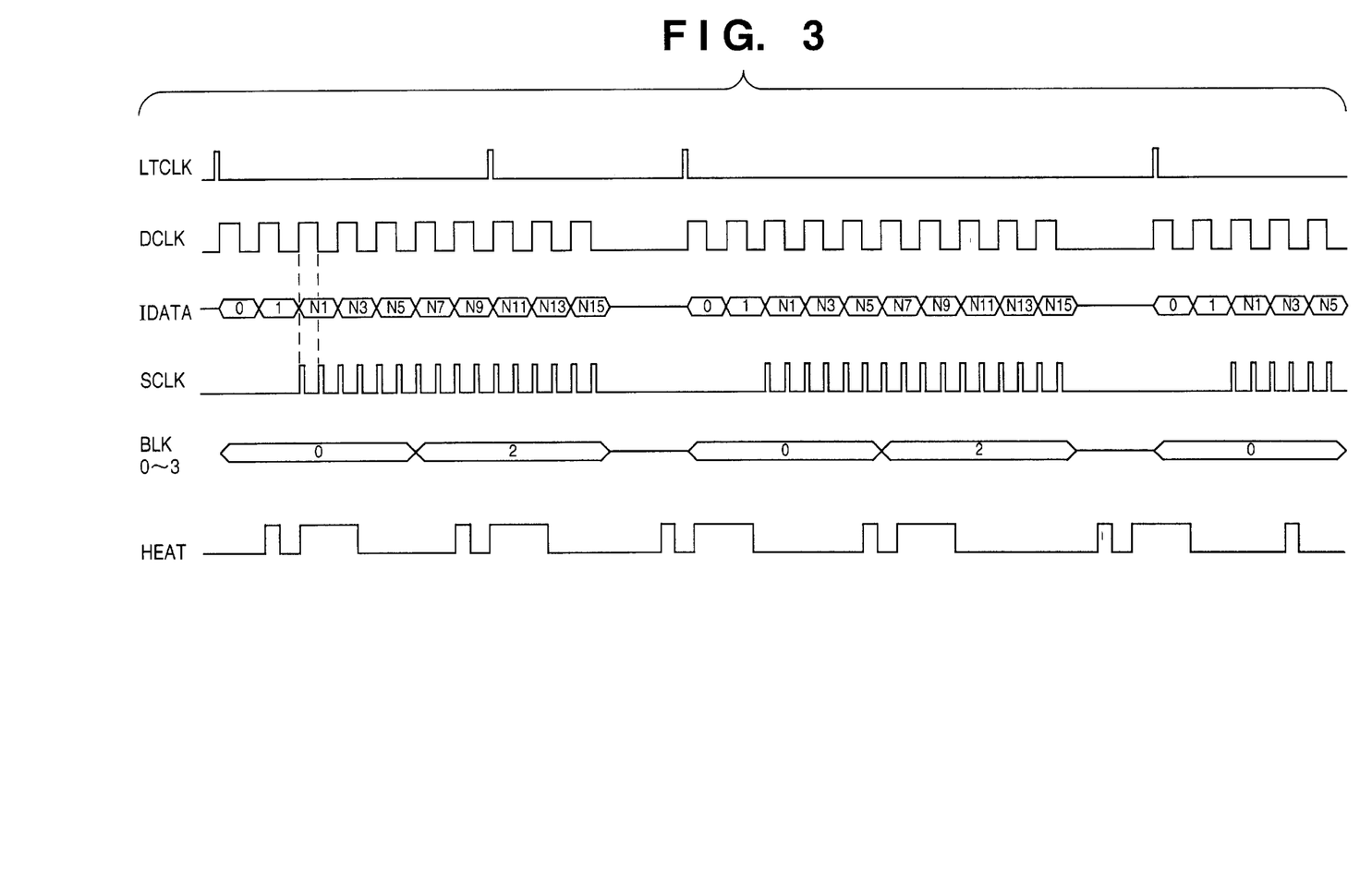
FIG. 3 is a timing chart of a 1/2-thinning print mode according to the embodiment.
Figure 4:
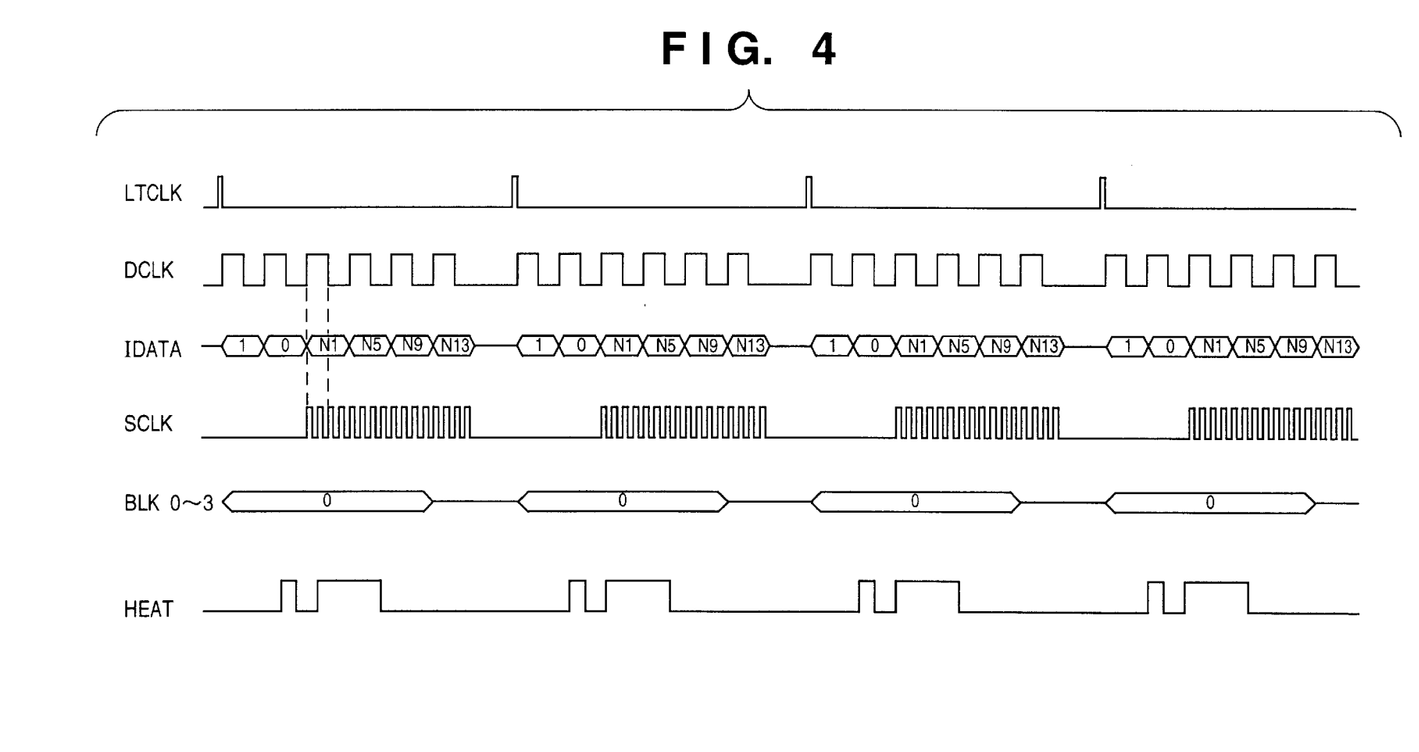
FIG. 4 is a timing chart of a 1/4-thinning print mode according to the embodiment.
Figure 5:
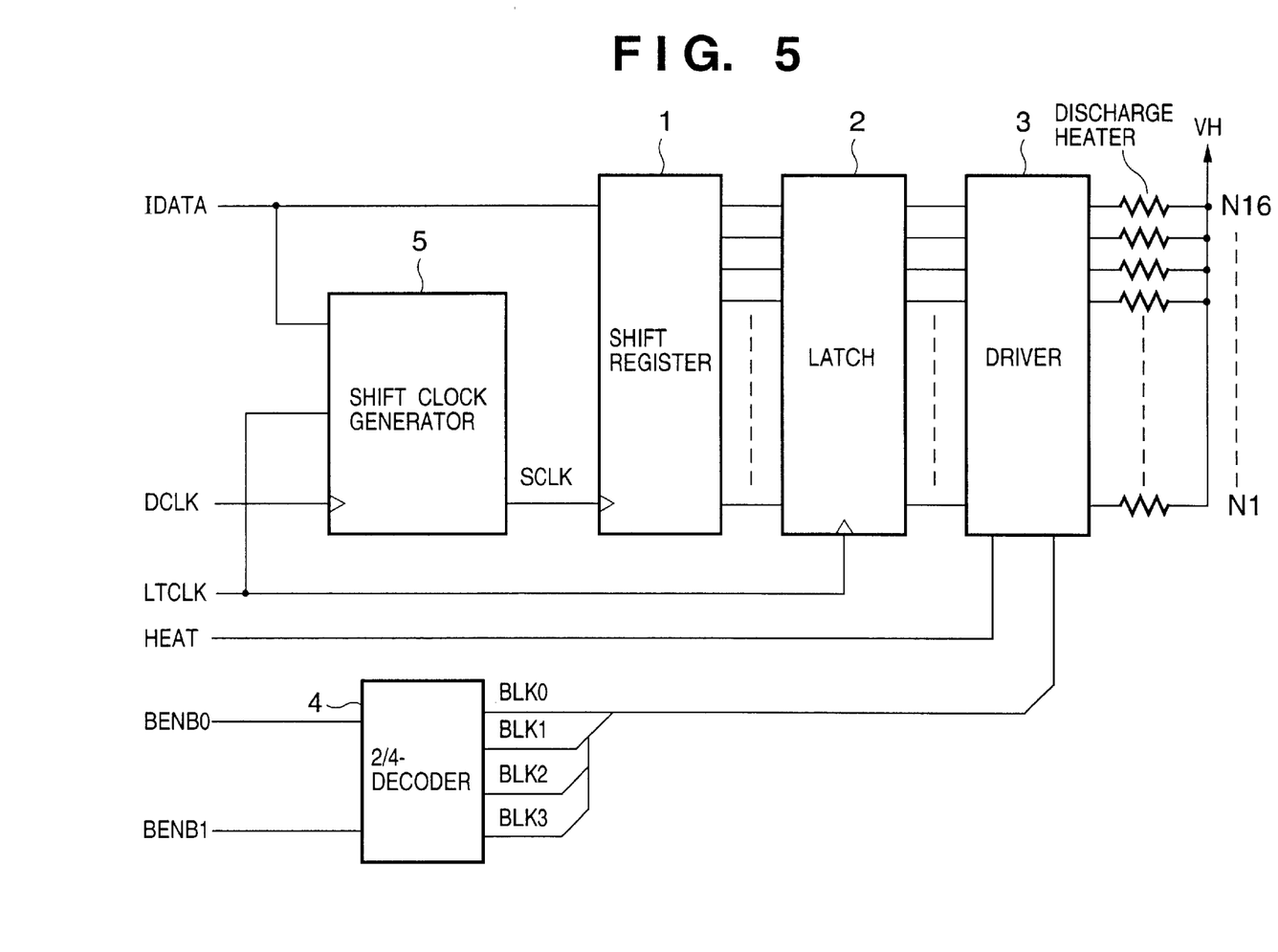
FIG. 5 is a block diagram showing the internal circuit of a printhead according to the embodiment.

FIG. 5 is a block diagram showing the internal circuit of the printhead according to the embodiment for transferring such print data. FIGS. 2 to 4 are timing charts in printing in the respective print modes. FIG. 2 corresponds to the normal mode, FIG. 3 corresponds to the 1/2-thinning mode, and FIG. 4 corresponds to the 1/4-thinning mode.

Similar to the conventional printhead described with reference to FIG. 7, the printhead of the embodiment comprises a shift register 1, latch 2, driver 3, 2/4-decoder 4, discharge heaters N1 to N16, and in addition shift clock generator 5.

The number of lines of signals transmitted from the printer main body to the printhead of the embodiment is the same as in the conventional printhead. In this embodiment, a signal representing a print mode is serially transmitted from the printer main body via a signal line IDATA immediately before transfer of print data. In other words, 2-bit data for setting a print mode is first transferred via the signal line IDATA, and then print data of respective nozzles are transferred.

As shown in FIGS. 2 to 4, data transferred to the printhead of the embodiment are output from the printer main body in units of DCLKs as a period, i.e., 2+16=18 clocks in the normal mode, 2+8=10 clocks in the 1/2-thinning mode, and 2+4=6 clocks in the 1/4-thinning mode. The print mode is set by 2-bit data transmitted via IDATA in synchronism with the first two clocks. (0,0) means the normal print mode; (0,1), the 1/2-thinning print mode; and (1,0), the 1/4-thinning print mode.

The operation of the shift clock generator 5 for setting the print mode in the embodiment and generating a shift clock SCLK used as a control signal for the shift register 1 will be explained. In this case, the period of the data clock signal DCLK is 120 ns, and printing in the 1/2-thinning mode will be exemplified with reference to FIG. 3.

Figure 6:
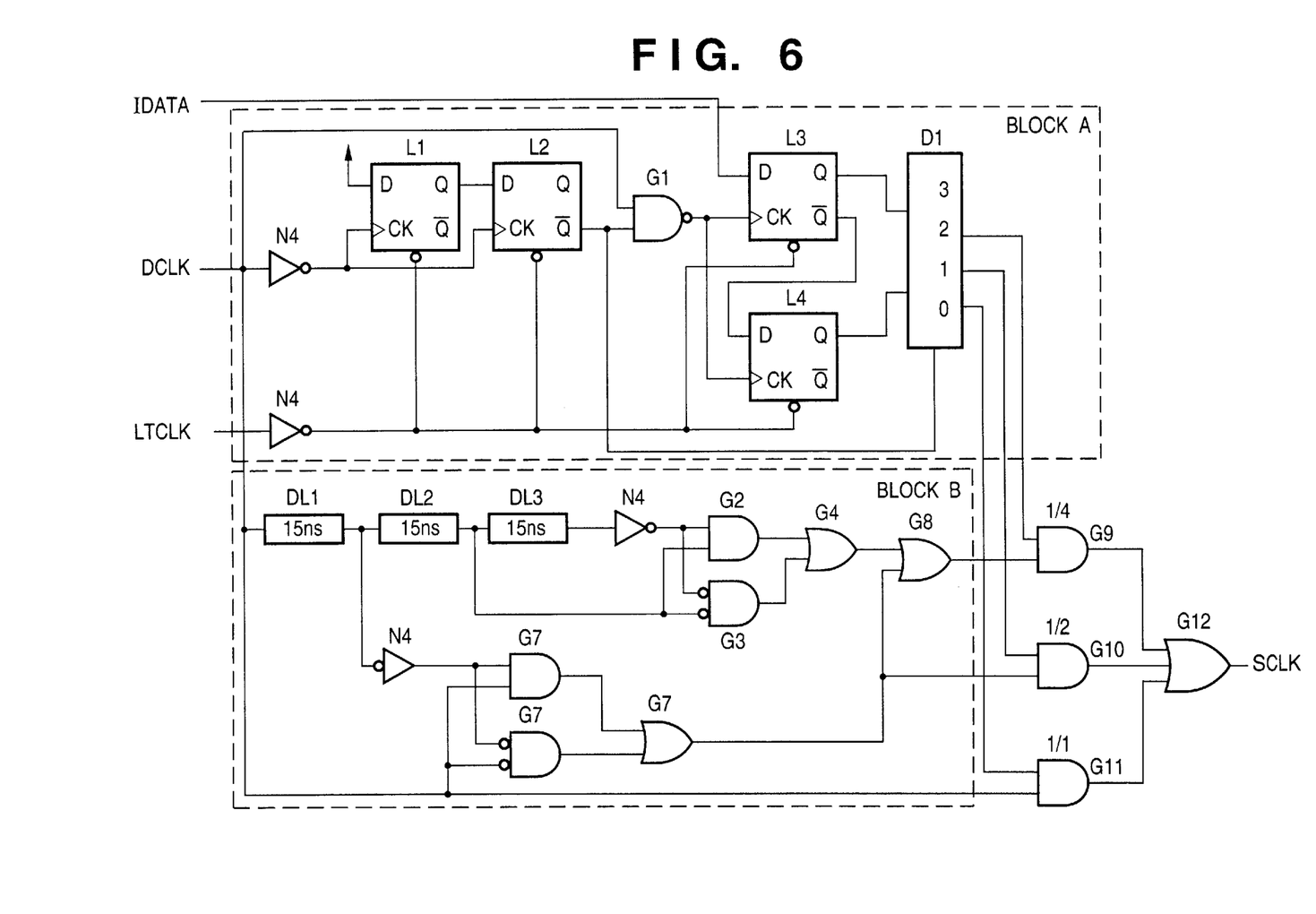
FIG. 6 is a circuit diagram of a shift clock generator in FIG. 5.

FIG. 6 is a circuit diagram showing the shift clock generator 5 for setting the print mode. In FIG. 6, the shift clock generator 5 receives three signals IDATA, DCLK, and LTCLK, and outputs the shift clock SCLK. Block A in FIG. 6 is a print mode setting section, and block B is a shift clock generation section.

In block A, when a pulse is output to LTCLK, reading of the print mode starts and is completed at the trailing edge of the pulse of the second clock of DCLK. Two-bit data (0,1) representing the 1/2-thinning print mode are respectively held by latches L4 and L3, and the data are converted to any one of three signals 0 to 2 (1 in this case) by a decoder D1. The decoded signals 0 to 2 are connected to corresponding terminals of gates G9 to G11 in order to select the signal SCLK necessary for each print mode. The signals 0 to 2 select a clock signal to be output to SCLK.

After setting of the print mode is completed, an output from the decoder D1 is enabled. After that, a shift clock is generated in block B, and a shift clock selected by the gates G9 to G11 is output as SCLK.

Block B is constituted by a part in which the first positive pulse having a pulse width of 15 ns is generated at the timings of the leading and trailing edges of DCLK, and a part in which the second positive pulse having a pulse width of 15 ns is generated at a timing delayed from the first pulse by 30 ns. The first and second pulses are respectively output from gates G7 and G8.

The signal SCLK output from a gate G12 for the 1/2-thinning print mode becomes a signal having a pulse width of 15 ns and a period of 60 ns in accordance with an output signal from block A, as shown in FIG. 3. In the normal print mode, the signal DCLK is directly output, as shown in FIG. 2. In the 1/4-thinning print mode, a signal having a pulse width of 15 ns and a period of 30 ns is output as the signal SCLK.

While print data to one nozzle is output, two clocks in the 1/2-thinning print mode or four clocks in the 1/4-thinning print mode are output from SCLK. Print data are stored in synchronism with the signal SCLK generated in this way, and print data as shown in FIG. 1 are set for the respective nozzles.

Note that an FPC cable for transmitting an electrical signal to the carriage in the above-mentioned manner generally has a serial transfer limit of about 10 MHz. The signal SCLK used in this embodiment has about 33 MHz in the 1/4-thinning print mode. However, the signal SCLK is used only in the shift clock generator 5 and shift register 1 among the internal circuits of the printhead, so no problem arises as far as these circuits are formed on the same semiconductor substrate. In the embodiment, all the internal circuits of the printhead are formed on the same silicon substrate.

In the nozzle arrangement shown in FIG. 1, printing nozzles in the 1/4-thinning print mode are N1, N5, N9, and N13. Alternatively, a combination of other nozzles, e.g., N2, N6, N10, and N14 may be adopted. The printhead may be driven while the combination of nozzles are changed for each column, like thinning driving in the multipass print mode. This also applies to a case wherein the thinning ratio is changed.

As described above, this embodiment exhibits the following effects.

(1) Since only data of an actually used printing nozzle is transferred, the time required for printing using all the nozzles can be shortened by thinning.

(2) Even if the number of passes in multipass printing is increased, data can be printed within the same printing time as in one-pass printing.

(3) Since the print data transfer clock can be decreased in frequency, malfunctions and induction noise to the outside can be suppressed to improve the reliability of the printer.

Other Embodiment

In the above embodiment, the shift clock generator is added to the internal circuit of the printhead, and setting of the print mode and distribution of print data are done in the printhead. Alternatively, the shift clock generator may be disposed on a PCB present near the printhead where the same processes is executed. In this arrangement, the transfer speed slightly decreases in comparison with the embodiment, but the same effects can be obtained using a conventional printhead.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796, is preferable. The above system is applicable to either one of a so-called on-demand type or continuous type system. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printing head, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printing head, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Application Laid-Open No. 59-123670, which discloses the arrangement using a slot common to a plurality of electrothermal transducers as a discharge portion of the electrothermal transducers, or Japanese Patent Application Laid Open No. 59-138461, which discloses the arrangement having an opening for absorbing a pressure wave of heat energy in correspondence with a discharge portion.

Furthermore, as a full line type printing head having a length corresponding to the width of a maximum printing medium which can be printed by the printer, either the arrangement which satisfies the full-line length by combining a plurality of printing heads as disclosed in the above specification or the arrangement as a single printing head obtained by forming printing heads integrally can be used.

In addition, not only an exchangeable chip type printing head, as described in the above embodiment, which can be electrically connected to the apparatus main unit and can receive an ink from the apparatus main unit upon being mounted on the apparatus main unit but also a cartridge type printing head in which an ink tank is integrally arranged on the printing head itself can be applicable to the present invention.

It is preferable to add recovery means for the printing head, preliminary auxiliary means, and the like provided as an arrangement of the printer of the present invention since the printing operation can be further stabilized. Examples of such means include,—for the printing head, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printing head or by combining a plurality of printing heads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through-holes, as described in Japanese Patent Application Laid-Open No. 54-56847 or 60-71260. In the present invention, the above-mentioned film boiling system is most effective for the above-mentioned inks.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments being realized by executing the program codes which are read by a computer, the present invention includes a case where an OS (operating system) or the like working on the computer performs a part of or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, the CPU or the like contained in the function expansion card or unit performs a part of or entire processes in accordance with designations of the program codes and realizes functions of the above embodiments.

If the present invention is realized as a storage medium, program codes corresponding to the above-mentioned timing charts (FIGS. 2, 3 and/or FIG. 4) are to be stored in the storage medium.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus for printing by scanning a print medium by a carriage which supports a printhead having a plurality of printing elements aligned in a predetermined direction, in a direction crossing an alignment direction of the printing elements, comprising:

transmission means for serially transmitting print data to the printhead with a predetermined frequency;

storage means for storing the print data transmitted from said transmission means in correspondence with the respective printing elements;

holding means for holding the print data stored in said storage means; and driving means for driving the respective printing elements in accordance with the print data held in said holding means, wherein in a case where a print mode in which printing is performed only by some of the plurality of printing elements in one scan is selected, said transmission means transmits print data corresponding to the printing elements used for printing, and said storage means stores data transmitted from said transmission means at a speed inversely proportional to the ratio of the number of printing elements used for printing to the transmission speed of the print data, thereby a frequency for storing by said storage means being different from the predetermined frequency.

2. The apparatus according to claim 1, wherein said storage means stores data corresponding to the printing elements used for printing in areas corresponding to printing elements not used for printing.

3. The apparatus according to claim 1, wherein the print mode prints using 1/N of all the printing elements, where N is an integer.

4. The apparatus according to claim 1, wherein said transmission means adds data representing the print mode before the print data, and serially transmits the print data.

5. The apparatus according to claim 1, wherein said storage means includes clock generation means for generating a second clock signal serving as a reference in storing the data from a first clock signal serving as a reference of print data transmitted to the printhead in accordance with a selected print mode.

6. The apparatus according to claim 1, wherein said storage means, said holding means, and said driving means are arranged in the printhead.

7. The apparatus according to claim 6, wherein said storage means, said holding means, and said driving means are formed on the same semiconductor substrate by a semiconductor manufacturing process.

8. The apparatus according to claim 1, wherein the printhead comprises an inkjet printhead for discharging ink to print.

9. The apparatus according to claim 8, wherein the inkjet printhead discharges the ink using thermal energy, and comprises a thermal energy transducer for generating the thermal energy to be applied to the ink.

10. A printing method of printing by scanning a print medium by a carriage, which supports a printhead having a plurality of printing elements aligned in a predetermined direction, in a direction crossing an alignment direction of the printing elements, comprising:

a transmission step of serially transmitting print data to the printhead with a predetermined frequency;

a storage step of storing the print data transmitted in the transmission step in storage means in correspondence with the respective printing elements;

a holding step of holding in holding means the print data stored in the storage means; and a driving step of driving the respective printing elements in accordance with the print data held in the holding means, wherein in a case where a print mode in which printing is performed only by some of the plurality of printing elements in one scan is selected, the transmission step comprises transmitting print data corresponding to the printing elements used for printing, and the storage step comprises storing data transmitted in the transmission step at a speed inversely proportional to the ratio of the number of printing elements used for printing to the transmission speed of the print data, thereby a frequency for storing in said storage step being different from the predetermined frequency.

11. The method according to claim 10, wherein the storage step comprises storing data corresponding to the printing elements used for printing in areas of the storage means corresponding to printing elements not used for printing.

12. The method according to claim 10, wherein the print mode prints using 1/N of all the printing elements, wherein N is an integer.

13. The method according to claim 10, wherein the transmission step comprises adding data representing the print mode before the print data, and serially transmitting the print data.

14. The method according to claim 10, wherein the storage step includes the clock generation step of generating a second clock signal serving as a reference in storing the data from a first clock signal serving as a reference of print data transmitted to the printhead in accordance with a selected print mode.

15. A storage medium which stores program codes for realizing a printing method of printing by scanning a print medium by a carriage, which supports a printhead having a plurality of printing elements aligned in a predetermined direction, in a direction crossing an alignment direction of the printing elements, wherein the printing method comprises:

a transmission step of serially transmitting print data to the printhead with a predetermined frequency;

a storage step of storing the print data transmitted in the transmission step in storage means in correspondence with the respective printing elements;

a holding step of holding in holding means the print data stored in the storage means; and a driving step of driving the respective printing elements in accordance with the print data held in the holding means, wherein in a case where a print mode in which printing is performed only by some of the plurality of printing elements in one scan is selected, the transmission step comprises transmitting print data corresponding to the printing elements used for printing, and the storage step comprises storing data transmitted in the transmission step at a speed inversely proportional to the ratio of the number of printing elements used for printing to the transmission speed of the print data, thereby a frequency for storing in said storage step being different from the predetermined frequency.

16. A printing apparatus for printing using a printhead having a plurality of printing elements, comprising:

transmission means for serially transmitting print data to the printhead with a predetermined frequency;

storage means for storing the print data transmitted from said transmission means in correspondence with the respective printing elements; and driving means for driving the respective printing elements in accordance with the print data stored in said storage means, wherein in a case where printing is performed by using some of the plurality of printing elements, said storage means stores the print data with a clock having a frequency higher than that of a clock used for transmitting the print data, thereby a frequency for storing by said storage means being different from the predetermined frequency.

17. The printing apparatus according to claim 16, further comprising a clock generating circuit for generating the clock used for storing the print data based on the clock used for transmitting the print data.

18. The printing apparatus according to claim 16, wherein said storage means comprises a shift register which shifts data stored therein with the clock having the frequency higher than that of the clock used for transmitting the print data.

19. A printhead having a plurality of printing elements, comprising:

a data input terminal for receiving print data with a predetermined frequency;

storage means for storing print data inputted through said data input terminal in correspondence with the respective printing elements; and driving means for driving the respective printing elements in accordance with the print data stored in said storage means, wherein in a case where printing is performed by using some of the plurality of printing elements, said storage means stores the print data with a clock having a frequency higher than that of a clock used for inputting the print data, thereby a frequency for storing by said storage means being different from the predetermined frequency.

20. The printhead according to claim 19, further comprising a clock generating circuit for generating the clock used for storing the print data based on the clock used for inputting the print data.

21. The printhead according to claim 19, wherein said storage means comprises a shift register which shifts data stored therein with the clock having the frequency higher than that of the clock used for inputting the print data.

* * * * *